US012732047B2

(12) United States Patent
Yamashita et al.

(10) Patent No.: US 12,732,047 B2
(45) Date of Patent: Sep. 8, 2026

(54) ROTATING ELECTRICAL MACHINE AND INSULATING TAPE

(71) Applicant: Toshiba Mitsubishi-Electric Industrial Systems Corporation, Tokyo (JP)

(72) Inventors: Yu Yamashita, Tokyo (JP); Tetsushi Okamoto, Tokyo (JP); Jinxia Xie, Tokyo (JP); Takahiro Imai, Kawasaki (JP); Hiromitsu Hirai, Kawasaki (JP)

(73) Assignee: TMEIC CORPORATION, Tokyo (JP)

( * ) Notice: Subject to any disclaimer, the term of this patent is extended or adjusted under 35 U.S.C. 154(b) by 216 days.

(21) Appl. No.: 18/685,930

(22) PCT Filed: Mar. 8, 2022

(86) PCT No.: PCT/JP2022/010036

§ 371 (c)(1),
(2) Date: Feb. 23, 2024

(87) PCT Pub. No.: WO2023/170794

PCT Pub. Date: Sep. 14, 2023

(65) Prior Publication Data

US 2024/0356402 A1 Oct. 24, 2024

(51) Int. Cl.
*H02K 3/32* (2006.01)
*H02K 3/04* (2006.01)

(52) U.S. Cl.
CPC ................ *H02K 3/04* (2013.01); *H02K 3/32* (2013.01)

(58) Field of Classification Search
CPC .. H02K 3/04; H02K 3/30; H02K 3/32; H02K 3/34; H02K 3/345; H02K 3/40; H01B 3/10; H01B 3/105; H01B 3/12; H01B 7/0208; H01B 7/0216; H01B 7/0258
USPC ........................................................ 310/208
See application file for complete search history.

(56) References Cited

U.S. PATENT DOCUMENTS

| | | | | |
|---|---|---|---|---|
| 5,314,984 A * | 5/1994 | Markovitz | .............. | C08L 63/00 525/929 |
| 6,359,232 B1 * | 3/2002 | Markovitz | .............. | H01B 3/04 174/209 |
| 2005/0274540 A1 * | 12/2005 | Smith | .............. | H02K 3/30 174/209 |
| 2013/0131218 A1 | 5/2013 | Gröppel et al. | | |

(Continued)

FOREIGN PATENT DOCUMENTS

| | | |
|---|---|---|
| EP | 3480920 A1 | 5/2019 |
| WO | 2018/002971 A1 | 1/2018 |

OTHER PUBLICATIONS

Extended European search report issued on Oct. 9, 2025, in corresponding European patent Application No. 22930779.8, 8 pages.

(Continued)

*Primary Examiner* — Michael Andrews
(74) *Attorney, Agent, or Firm* — XSENSUS LLP

(57) ABSTRACT

An insulating tape includes a base layer, two adhesive layers, and two reinforcing layers. The base layer has a first surface and a second surface opposite to the first surface. The two adhesive layers contain nano-sized silica particles, and each overlap a corresponding one of the first surface and the second surface. The two reinforcing layers are each provided for a corresponding one of the first surface and the second surface, and are bonded to the base layer by the adhesive layers.

10 Claims, 8 Drawing Sheets

(56) References Cited

U.S. PATENT DOCUMENTS

| | | | | |
|---|---|---|---|---|
| 2015/0069877 | A1* | 3/2015 | Otowa | H02K 3/30 523/400 |
| 2019/0149010 | A1* | 5/2019 | Mura | H01B 17/62 310/90 |
| 2025/0119018 | A1* | 4/2025 | Mabuchi | H02K 3/30 |

OTHER PUBLICATIONS

International Search Report and Written Opinion mailed on May 10, 2022, received for PCT Application PCT/JP2022/010036, filed on Mar. 8, 2022, 8 pages including English Translation.

* cited by examiner

ROTATING ELECTRICAL MACHINE AND INSULATING TAPE

CROSS-REFERENCE TO RELATED APPLICATION

This application is based on PCT filing PCT/JP2022/010036, filed Mar. 8, 2022, the entire contents of which are incorporated herein by reference.

TECHNICAL FIELD

The present invention relates to a rotating electrical machine and an insulating tape.

BACKGROUND ART

A coil used in a rotating electrical machine such as an electric motor or a generator is provided with an insulating structure configured to prevent a current flowing through a conductor in the coil from leaking to the outside.

As the insulating structure as described above, known is a structure in which an insulating tape is wound around the conductor.

CITATION LIST

Patent Literature

Patent Document 1: US 2013/0131218 A1

SUMMARY OF INVENTION

Problem to be Solved by the Invention

It is advantageous if the lifetime of insulation properties of this type of insulating tape can be prolonged.

One of the objects of the present invention is to prolong the lifetime of insulation properties of an insulating tape.

Means for Solving Problem

A rotating electrical machine according to an embodiment of the present invention includes: a stator; a rotor rotatable with respect to the stator; and a coil provided at least in the stator among the stator and the rotor, and including a conductor and an insulating tape covering the conductor, wherein the insulating tape includes: a base layer having a first surface and a second surface opposite to the first surface; two adhesive layers containing nano-sized silica particles, and each overlapping a corresponding one of the first surface and the second surface; and two reinforcing layers that are each provided for a corresponding one of the first surface and the second surface, and are bonded to the base layer by the adhesive layers.

Effect of the Invention

According to a rotating electrical machine and an insulating tape of the embodiment of the present invention, it is possible to prolong the lifetime of insulation properties of the insulating tape.

DESCRIPTION OF EMBODIMENTS

Hereinafter, embodiments of the present invention will be described with reference to the drawings. In the present specification, components according to the embodiments and descriptions of the components may be described in a plurality of expressions. The components and the descriptions thereof are examples, and are not limited by the expressions of the present specification.

The components may also be identified with names different from those in the present specification. In addition, the components may be described by expressions different from the expressions in the present specification.

Configuration of Rotating Electrical Machine

Figure 1:
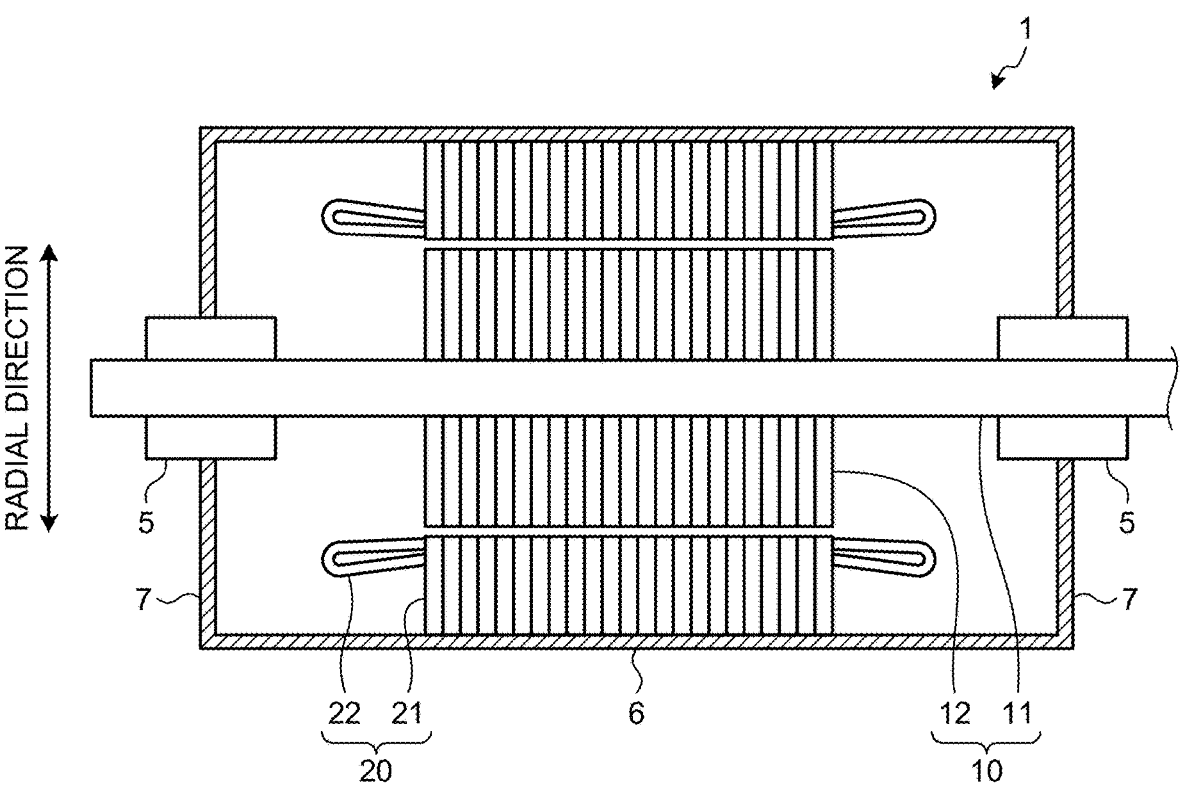
FIG. 1 is a cross-sectional view illustrating a configuration of a rotating electrical machine according to an embodiment.

FIG. 1 is a cross-sectional view illustrating a configuration of a rotating electrical machine 1 according to an embodiment.

The rotating electrical machine 1 includes a rotor 10 and a stator 20. The rotor 10 is rotatable with respect to the stator 20. The rotating electrical machine 1 is a component such as an electric motor, a generator, or the like.

The rotor 10 includes a rotor shaft 11 and a rotor core 12. The vicinity of opposite ends of the rotor shaft 11 is rotatably and pivotally supported by a bearing 5. The bearing 5 is fixed to a bearing bracket 7 provided to be integrated with a frame 6 forming an outer frame of the rotating electrical machine 1. The rotor core 12 is fixed to an outer peripheral surface of the rotor shaft 11 and rotates together with the rotor shaft 11.

The stator 20 includes a stator core 21 and an insulating coil 22. The stator core 21 is radially disposed outside the rotor core 12 with a gap therebetween. The insulating coil 22 is a member incorporated in the stator core 21 and configured to generate a magnetic field necessary for the rotating electrical machine 1, and has an insulating structure to be described later provided on an outer peripheral portion thereof. The insulating coil 22 is assembled so as to penetrate the stator core 21. The insulating coil 22 is an example of a coil.

Configuration of Insulating Coil

Figure 2:
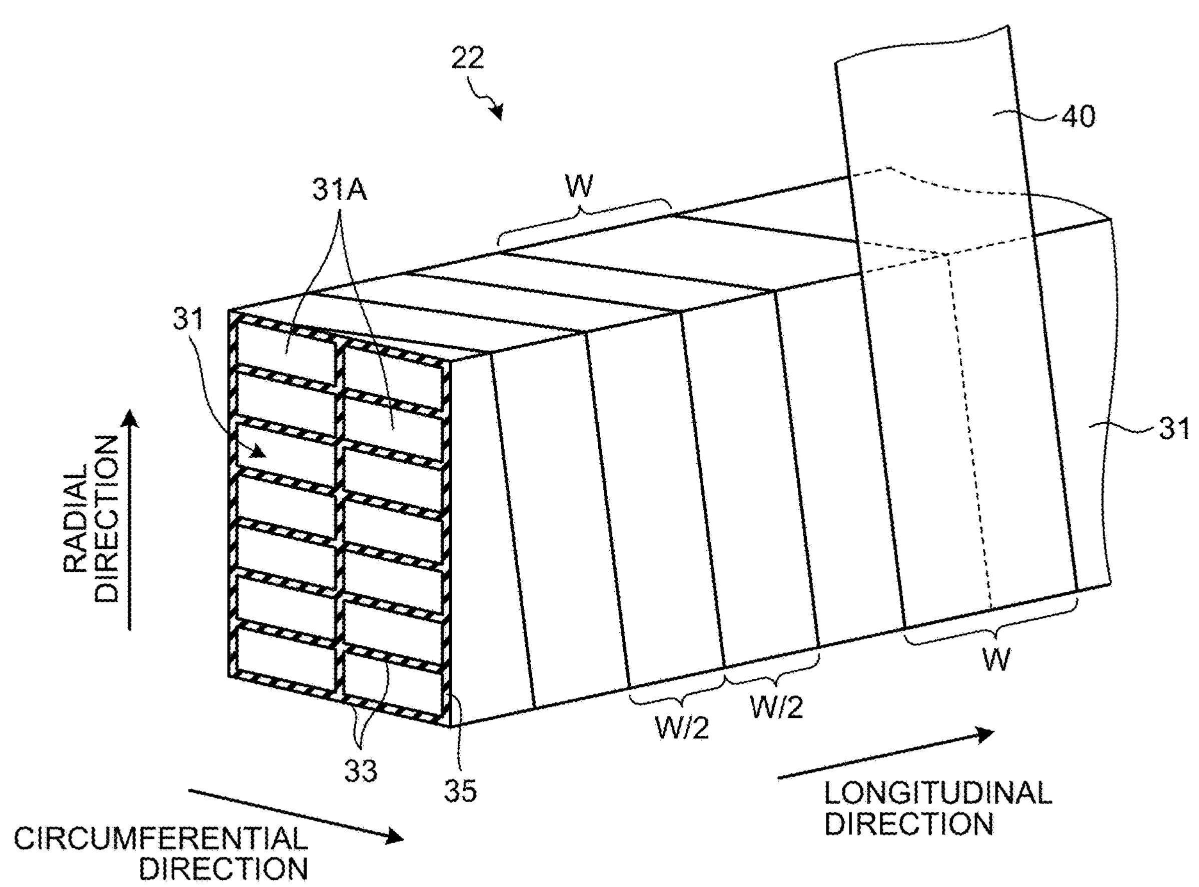
FIG. 2 is a perspective view illustrating a configuration of an insulating coil according to the embodiment.
Figure 3:
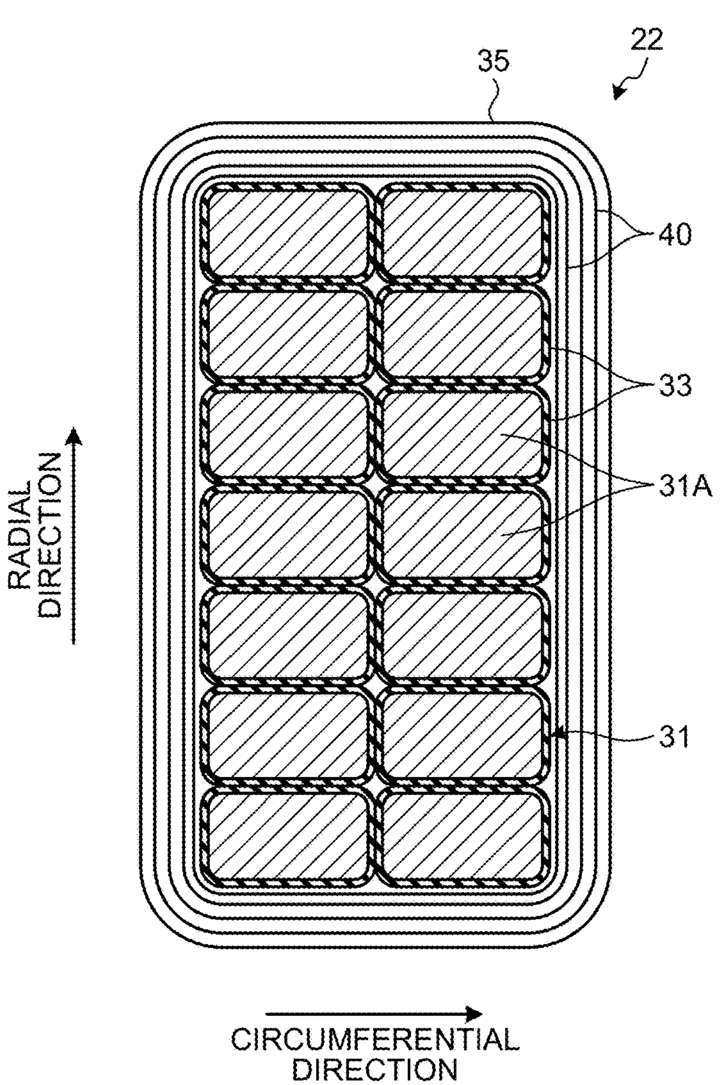
FIG. 3 is a cross-sectional view illustrating the configuration of the insulating coil according to the embodiment.

FIG. 2 is a perspective view illustrating a configuration of the insulating coil 22 according to the embodiment. FIG. 3 is a cross-sectional view illustrating the configuration of the insulating coil 22 according to the embodiment.

The insulating coil 22 includes a laminated conductor 31 (a conductor), a turn insulating portion 33, and a main insulating portion 35. The turn insulating portion 33 and the main insulating portion 35 form an insulating structure of the insulating coil 22.

The laminated conductor 31 is formed by laminating a plurality of conducting wires 31A. The laminated conductor 31 according to the present embodiment is configured by bundling fourteen (the number of laminations: seven, the number of columns: two) conducting wires 31A. Note that a configuration of the laminated conductor 31 is not limited thereto, and is to be appropriately designed depending on the use situation. The laminated conductor 31 may include, for example, more than fourteen conducting wires 31A, or may be configured by laminating only one conducting wire 31A.

The turn insulating portion 33 is provided on an outer surface of each conducting wire 31A. As a result, an outer surface of the laminated conductor 31 is in a state of being covered with the turn insulating portion 33. The main insulating portion 35 is provided outside the turn insulating portion 33. The main insulating portion 35 includes a wound insulating tape 40 (a tape-shaped member).

The insulating tape 40 according to the present embodiment is spirally wound by a half-wrap method. When a width of the insulating tape 40 is defined as W, a spiral pitch is W/2. That is, the insulating tape 40 is wound so as to overlap a half of the insulating tape 40 wound in the previous turn. After the winding of the entire laminated conductor 31 in a longitudinal direction is completed, the insulating tape 40 may be wound so as to further overlap thereon. Accordingly, the insulating tape 40 can be formed in a multilayer shape. As the number of layers of the insulating tape 40 increases, insulation performance can be improved. The number of windings of the insulating tape 40 may be appropriately selected depending on the required insulation performance or the like.

Figure 4:
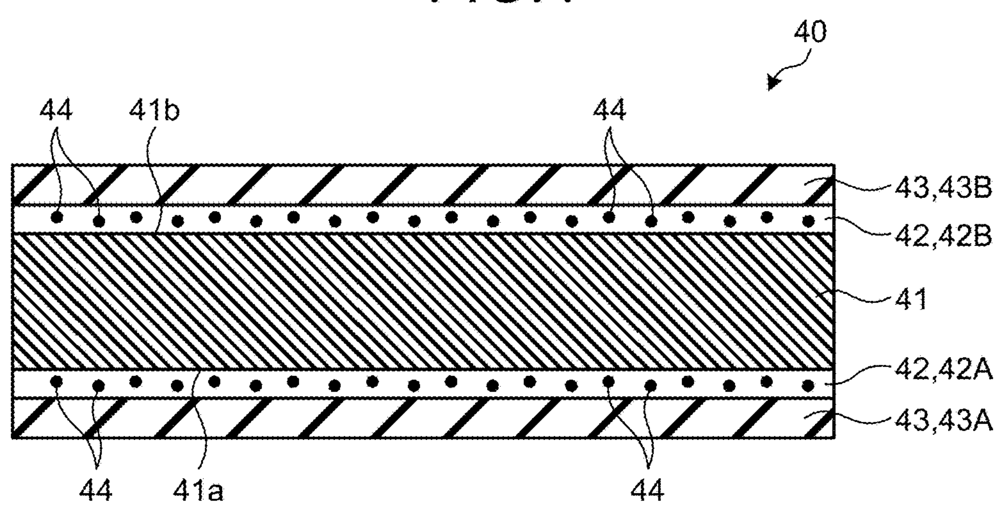
FIG. 4 is a cross-sectional view schematically illustrating the configuration of the insulating tape according to the embodiment.

FIG. 4 is a cross-sectional view schematically illustrating a configuration of the insulating tape 40 according to the embodiment.

The insulating tape 40 includes a base layer 41, two reinforcing layers 43A and 43B, and two adhesive layers 42A and 42B. Hereinafter, the two reinforcing layers 43A and 43B are collectively referred to as a reinforcing layer 43, and the two adhesive layers 42A and 42B are collectively referred to as an adhesive layer 42. The base layer 41 is also referred to as a main insulating layer, the adhesive layer 42 is also referred to as a polymer layer, and the reinforcing layer 43 is also referred to as a fiber reinforcing layer.

The base layer 41 is made of a non-conductive material, and is a main portion of implementing an insulating function of the insulating tape 40. The reinforcing layer 43 is a portion that supports the base layer 41 and has a function of securing strength of the insulating tape 40 as a whole. The adhesive layer 42 is a portion having a function of bonding the reinforcing layer 43 to the base layer 41.

The base layer 41 has a first surface 41*a* and a second surface 41*b* opposite to the first surface 41*a*. The base layer 41 contains, for example, inorganic substances such as mica, asbestos, and porcelain powder as a main component. A thickness of the base layer 41 is, for example, larger than a thickness of each of the reinforcing layer 43 and the adhesive layer 42, and is, for example, about 100 μm.

Among the two adhesive layers 42, the adhesive layer 42A overlaps the first surface 41*a*, and the adhesive layer 42B overlaps the second surface 41*b*.

The adhesive layer 42 includes a bonding polymer and the like. For example, the adhesive layer 42 includes an epoxy resin and nano-sized silica particles 44.

The two reinforcing layers 43 is each provided for a corresponding one of the first surface 41*a* and the second surface 41*b*, and is bonded to the base layer 41 by the adhesive layer 42. Specifically, the reinforcing layer 43A is provided for the first surface 41*a*, and is bonded to the first surface 41*a* by the adhesive layer 42A. The reinforcing layer 43B is provided for the second surface 41*b*, and is bonded to the second surface 41*b* by the adhesive layer 42B.

The reinforcing layer 43 contains, for example, glass fiber, polyester fiber, and the like as a main component, and is usually woven in a mesh shape. In addition, the reinforcing layer 43 is not limited to fibers, and may be formed as a nonwoven fabric or may be formed of a polymer film such as polyester or polyimide. The adhesive layer 42 contains, for example, an unsaturated polyester resin, an epoxy resin, and the like as a main component.

Internal Structure of Main Insulating Portion

Figure 5:
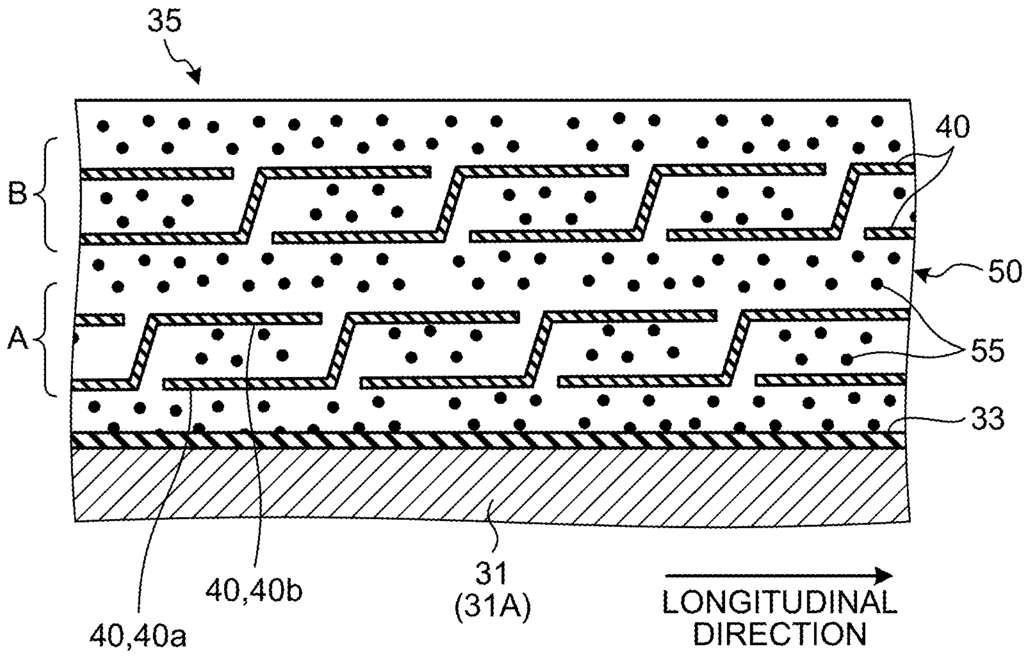
FIG. 5 is a cross-sectional view schematically illustrating an internal structure of a main insulating portion according to the embodiment.

FIG. 5 is a cross-sectional view schematically illustrating an internal structure of the main insulating portion 35 according to the embodiment.

FIG. 5 illustrates a cross section along the longitudinal direction of the laminated conductor 31 (the conducting wire 31A). FIG. 5 illustrates a case in which the insulating tape 40 is wound twice, and a taping layer A formed by the first winding and a taping layer B formed by the second winding are included in the main insulating portion 35.

The main insulating portion 35 includes the insulating tape 40 and a covering portion 50. In each of the taping layer A and the taping layer B, the base layers 41 adjacent to each other in the longitudinal direction overlap each other by a half of the width. This is due to the winding method of the half-wrap method. The covering portion 50 is also referred to as an impregnation portion.

The covering portion 50 bonds (joins) the insulating tape 40 to the turn insulating portion 33, and bonds portions 40*a* and 40*b* overlapping each other in the insulating tape 40 to each other. The covering portion 50 covers the laminated conductor 31.

The covering portion 50 has a resin containing mica particles 55 in which a resin 47 to be described later is solidified. The mica particles are an example of nanofillers. In FIG. 5, a thickness of the insulating tape 40 is depicted to be thin in order to emphasize the covering portion 50. As illustrated in FIG. 5, the insulating tape 40 is covered with the covering portion 50 having the mica particles 55 dispersed therein.

The mica particles 55 are non-conductive nano-order particles, and are, for example, particles containing metal oxide. A particle size of the mica particles 55 is preferably 50 nm or less. A specific example of a substance forming the mica particles 55 will be described later.

Figure 6:
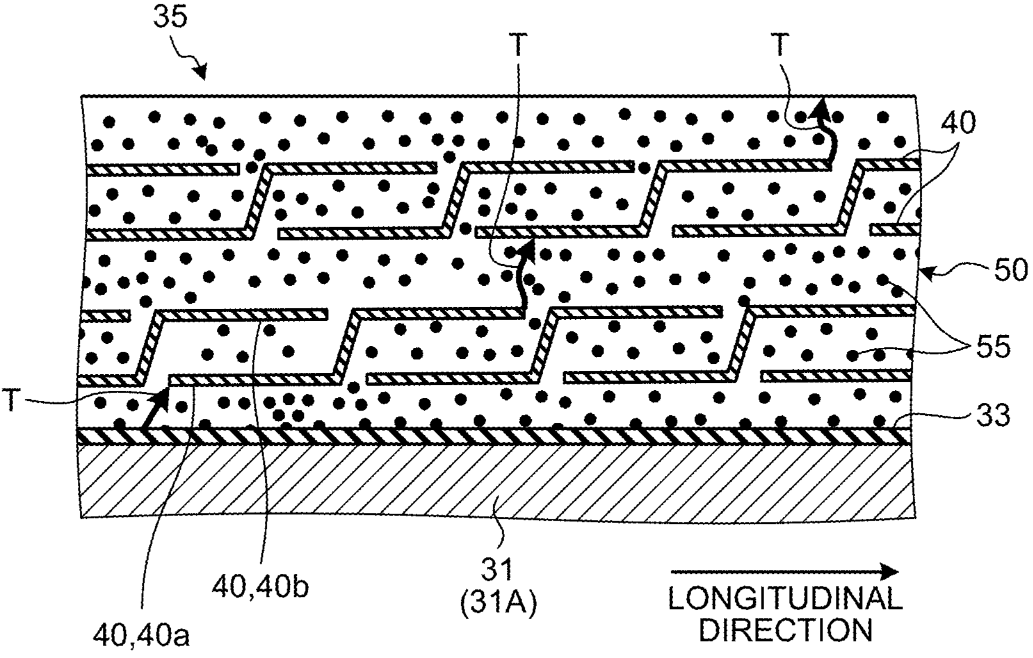
FIG. 6 is a cross-sectional view of the main insulating portion schematically illustrating an effect of mica particles according to the embodiment.
Figure 7:
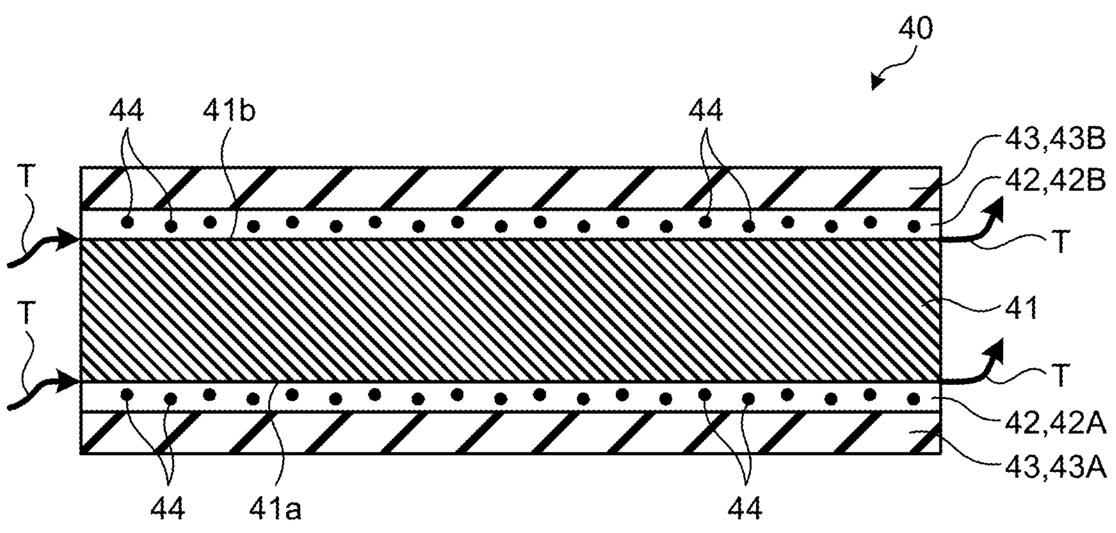
FIG. 7 is a cross-sectional view of the insulating tape schematically illustrating an effect of silica particles according to the embodiment.

FIG. 6 is a cross-sectional view of the main insulating portion 35 schematically illustrating an effect of the mica particles 55 according to the embodiment. FIG. 7 is a cross-sectional view of the insulating tape 40 schematically illustrating an effect of the silica particles 44 according to the embodiment.

FIG. 6 illustrates a state in which an electrical tree T is generated in the covering portion 50. The electrical tree T is an electrical deterioration phenomenon caused by a voltage applied to the laminated conductor 31 and the stator 20. When the electrical tree T develops and reaches a surface layer portion of the main insulating portion 35, dielectric breakdown occurs, and the rotating electrical machine 1 stops its operation.

The mica particles 55 dispersed in the covering portion 50 have an effect of preventing linear development of the electrical tree T and reducing a development speed of the electrical tree T. Thus, the insulation performance of the main insulating portion 35 can be improved. Such a development preventing effect varies depending not only on the content of the mica particles 55 but also on the dispersibility thereof. The development preventing effect increases as dispersibility (dispersion uniformity) of the mica particles 55 in the covering portion 50 increases.

Therefore, in order to improve the development preventing effect (the insulation performance), it is important to use a resin having high dispersibility of the mica particles 55.

Further, as illustrated in FIG. 7, in the insulating tape 40, the electrical tree T easily advances on the first surface 41$a$ and the second surface 41$b$ of the base layer 41. That is, the electrical tree T advances through the adhesive layer 42 in the insulating tape 40. At this time, the silica particles 44 of the adhesive layer 42 prevent the development of the electrical tree T. The first surface 41$a$ and the second surface 41$b$ of the base layer 41 can also be referred to as interfaces between the base layer 41 and the adhesive layer 42.

Method of Manufacturing Insulating Structure

Figure 8:
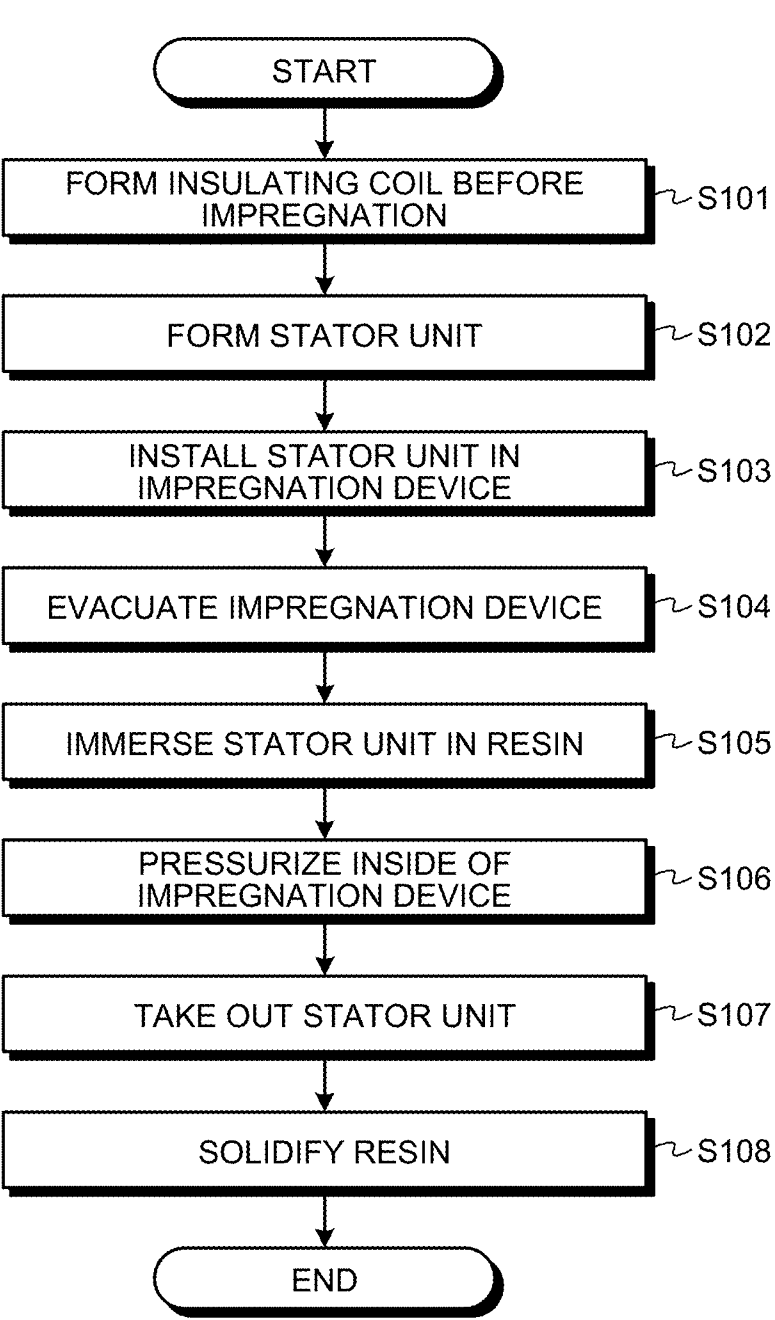
FIG. 8 is a flowchart illustrating a procedure in a method of manufacturing an insulating structure of the insulating coil according to the embodiment.
Figure 9:
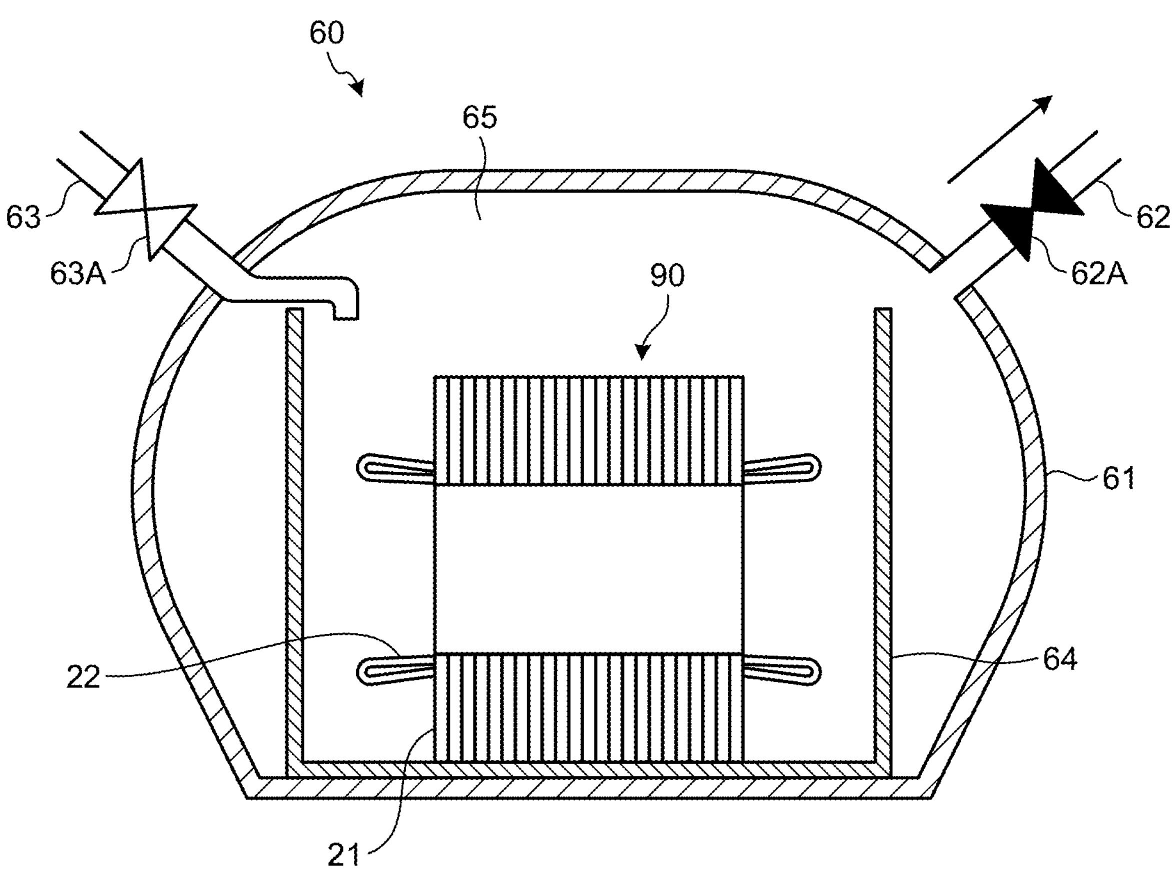
FIG. 9 is a view illustrating a state in the first half stage of an impregnation device used in the method of manufacturing the insulating structure according to the embodiment.
Figure 10:
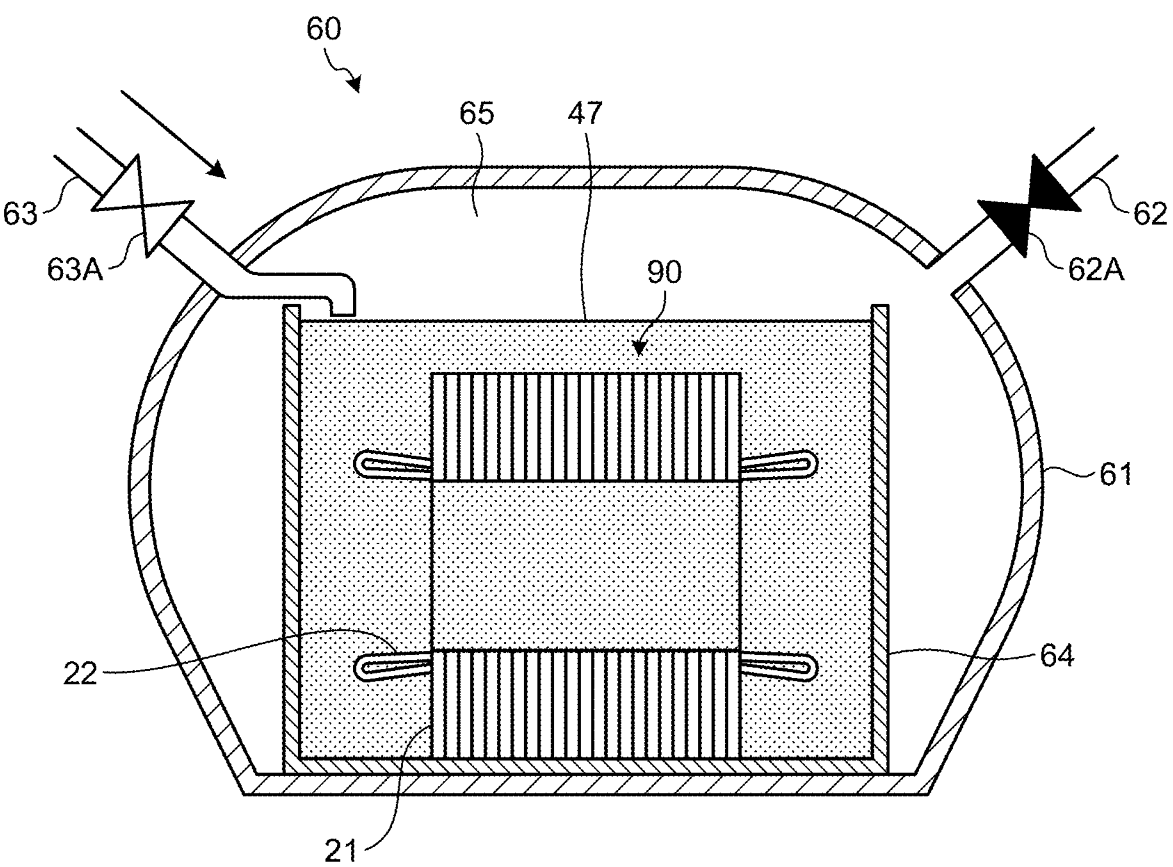
FIG. 10 is a view illustrating a state in the second half stage of the impregnation device used in the method of manufacturing the insulating structure according to the embodiment.

FIG. 8 is a flowchart illustrating a procedure in a method of manufacturing the insulating structure of the insulating coil 22 according to the embodiment. FIG. 9 is a view illustrating a state in the first half stage of an impregnation device 60 used in the method of manufacturing the insulating structure according to the embodiment. FIG. 10 is a view illustrating a state in the second half stage of the impregnation device 60 used in the method of manufacturing the insulating structure according to the embodiment.

First, the insulating tape 40 is wound around the laminated conductor 31 (refer to FIG. 2) to form the insulating coil 22 before resin impregnation (S101). Thereafter, the insulating coil 22 before resin impregnation is inserted into the stator core 21 and assembled to form a stator unit 90 (refer to FIG. 9) (S102). Thereafter, the stator unit 90 is installed in the impregnation device 60 (S103), and the impregnation device 60 is evacuated (S104).

As illustrated in FIG. 9, the impregnation device 60 includes an airtight container 61, an exhaust pipe 62, an exhaust valve 62A, a supply pipe 63, a supply valve 63A, and a treatment tank 64. In Step S103, the stator unit 90 is installed in the treatment tank 64 placed in the airtight container 61. Thereafter, in Step S104, the airtight container 61 is evacuated. When evacuation is performed, the supply valve 63A is closed, and air in the airtight container 61 is suctioned by a suction device connected to the exhaust pipe 62. As a result, the inside of the insulating coil 22 and the space inside the turn insulating portion 33 and the insulating tape 40 wound therearound are all in a vacuum state.

After the vacuuming is performed as described above, as illustrated in FIG. 10, the stator unit 90 in the treatment tank 64 is immersed in the resin 47 (S105). At this time, the exhaust valve 62A is closed, and the resin 47 is supplied from the supply pipe 63 into the treatment tank 64. The resin 47 is supplied so that the entire stator unit 90 is immersed.

After the stator unit 90 is immersed in the resin 47 as described above, the inside of the impregnation device 60 (the airtight container 61) is pressurized (S106). As illustrated in FIG. 10, the pressurization is performed by opening the supply valve 63A and supplying pressurized gas 65 from the supply pipe 63 into the airtight container 61. The pressurized gas 65 is preferably a substance that does not react with the resin 47, and is preferably an inert gas such as nitrogen gas or dry air. By pressurizing the inside of the airtight container 61 in this manner, the resin 47 containing the mica particles 55 is impregnated into the turn insulating portion 33 of the insulating coil 22 and the overlapping portion of the insulating tape 40.

Thereafter, the stator unit 90 is taken out from the impregnation device 60 (S107), and the resin 47 impregnated in the insulating coil 22 including the insulating tape 40 is solidified (S108). The method of solidifying the resin 47 is determined depending on the properties of the epoxy resin to be used. For example, when a thermosetting epoxy resin is used, a method of housing the stator unit 90 in a drying furnace having a predetermined temperature for a predetermined time is performed, and the stator 20 is finally obtained (refer to FIG. 1). Thereafter, the stator 20 is attached to the frame 6 forming the outer frame. Depending on the specifications of the rotating electrical machine 1, the insulating coil 22 may be assembled in the stator core 21 previously attached to the frame 6. In this case, the assembly of the frame 6, the stator core 21, and the insulating coil 22 is treated as the stator unit 90.

Configuration of Resin

The resin 47 according to the present embodiment is a composition produced by mixing an epoxy resin, a nanofiller, a reactive diluent, and an acid anhydride-based curing agent (a curing agent).

The epoxy resin contains a compound which contains two or more three-membered rings consisting of two carbon atoms and one oxygen atom in one molecule and can be cured. The epoxy resin contains, for example, a bisphenol A epoxy resin, an alicyclic epoxy resin, a bisphenol F type epoxy resin, a biphenyl type epoxy resin, a naphthalene type epoxy resin, a novolac type epoxy resin, a phenol novolac type epoxy resin, and the like as a main component. The epoxy resin may contain one of these compounds, or may contain two or more kinds thereof. Particularly, the epoxy resin preferably contains the alicyclic epoxy resin from the viewpoint of chemical affinity with the reactive diluent.

The nanofiller contains a nonconductive metal oxide or the like. The nanofiller contains, for example, alumina, silica, titanium oxide, magnesium oxide, bismuth trioxide, cerium dioxide, cobalt monoxide, copper oxide, iron trioxide, holmium oxide, indium oxide, manganese oxide, tin oxide, yttrium oxide, zinc oxide, and the like as a main component. The nanofiller may contain one of these compounds, or may contain two or more kinds thereof. A surface of the nanofiller may be modified with a coupling agent for the purpose of improving dispersibility in the epoxy resin, preventing re-aggregation, improving adhesiveness, and the like.

The reactive diluent reduces the viscosity of the epoxy resin by reacting with the epoxy resin. The reactive diluent contains a compound that can become a part of the skeleton in a cured product of a thermosetting resin composition by having a reactive group in the molecular skeleton. The reactive diluent contains, for example, butyl glycidyl ether, 1,4-butanediol diglycidyl ether, alkylene monoglycidyl ether, alkylphenol monoglycidyl ether, polypropylene glycol diglycidyl ether, alkylene diglycidyl ether, neopentyl glycol diglycidyl ether, 1,6-hexanediol diglycidyl ether, 1,12-dodecanediol diglycidyl ether, o-cresyl glycidyl ether, 1,2-epoxytetradecane, and the like as a main component. The reactive diluent may contain one of these compounds, or may contain two or more kinds thereof. Particularly, when the epoxy resin contains the alicyclic epoxy resin, the reactive diluent preferably contains butyl glycidyl ether.

The acid anhydride-based curing agent contains, for example, 4-methylhexahydrophthalic anhydride, hexahydrophthalic anhydride, tetrahydrophthalic anhydride, 4-methyltetrahydrophthalic anhydride, tetrabromophthalic anhydride, nadic anhydride, methyl nadic anhydride, trimellitic anhydride, pyromellitic anhydride, methylhymic anhydride, and the like as a main component. The acid anhydride-based curing agent may contain one of these compounds, or may contain two or more kinds thereof.

A curing accelerator may be used to accelerate the reaction in the step of solidifying (curing) the resin 47 in the drying furnace or the like. The curing accelerator contains, for example, a compound capable of accelerating the cross-linking reaction between the epoxy compound and the acid anhydride-based curing agent. The curing accelerator contains, for example, a metal chelate compound, an ammonium ion compound, an imidazole compound, and the like as a main component. The curing accelerator may contain one of these compounds, or may contain two or more kinds thereof.

The resin 47 contains, for example, an epoxy resin, a nanofiller, a reactive diluent, and an acid anhydride-based curing agent in the following proportions.

Epoxy resin: 30 wt % to 60 wt % . . . (1)

Acid anhydride-based curing agent: 30 wt % to 60 wt % . . . (2)

Reactive diluent: 5 wt % to 30 wt % . . . (3)

Nanofiller: 2 wt % to 30 wt % with respect to the total mixture of (1) to (3)

Effects of Embodiments

As described above, in the present embodiment, the rotating electrical machine 1 includes the stator 20, the rotor 10, and the insulating coil 22. The rotor 10 is rotatable with respect to the stator 20. The insulating coil 22 is provided at least in the stator 20 of the stator 20 and the rotor 10. The insulating coil 22 includes the laminated conductor 31 (the conductor) and the insulating tape 40 covering the laminated conductor 31. The insulating tape 40 includes the base layer 41, the two adhesive layers 42, and the two reinforcing layers 43. The base layer 41 has a first surface 41*a* and a second surface 41*b* opposite to the first surface 41*a*. The two adhesive layers 42 contain the nano-sized silica particles 44, and each of the two adhesive layers 42 overlaps a corresponding one of the first surface 41*a* and the second surface 41*b*. The two reinforcing layers 43 is each provided for a corresponding one of the first surface 41*a* and the second surface 41*b*, and the two reinforcing layers 43 are bonded to the base layer 41 by the adhesive layer 42.

According to such a configuration, since the adhesive layer 42 containing the nano-sized silica particles 44 is provided on both the first surface 41*a* and the second surface 41*b* of the base layer 41, the development of the electrical tree T can be prevented as compared with a configuration in which the adhesive layer 42 is provided on only one of the first surface 41*a* and the second surface 41*b*. Therefore, according to the above configuration, it is possible to prolong the lifetime of the insulation properties of the insulating tape 40.

Further, the insulating tape 40 has the portions 40*a* and 40*b* overlapping each other. The insulating coil 22 includes the covering portion 50 containing the nano-sized mica particles 55. Here, the covering portion 50 is interposed between the two portions 40*a* and 40*b* overlapping each other and configured to cover the laminated conductor 31.

According to such a configuration, the development of the electrical tree can be prevented by the mica particles 55 of the covering portion 50. Therefore, according to the above configuration, it is possible to prolong the lifetime of the insulation properties of the insulating tape 40.

The insulating tape 40 may be provided on both the stator and the rotor.

The above-described embodiments of the present invention do not limit the scope of the invention, and are merely examples included in the scope of the invention. In the embodiments of the present invention, for example, at least a part of the specific application, structure, shape, operation, and effect may be modified, omitted, or added to the above-described embodiments without departing from the gist of the invention.

EXPLANATIONS OF LETTERS OR NUMERALS

1 ROTATING ELECTRICAL MACHINE
10 ROTOR
20 STATOR
22 INSULATING COIL (COIL)
31 LAMINATED CONDUCTOR (CONDUCTOR)
40 INSULATING TAPE
40*a*, 40*b* PORTION
41 BASE LAYER
41*a* FIRST SURFACE
41*b* SECOND SURFACE
42, 42A, 42B ADHESIVE LAYER
43, 43A, 43B REINFORCING LAYER
44 SILICA PARTICLES
50 COVERING PORTION
55 MICA PARTICLES

The invention claimed is:

1. A rotating electrical machine comprising:

a stator;

a rotor rotatable with respect to the stator; and a coil provided at least in the stator among the stator and the rotor, and including a conductor and an insulating tape covering the conductor, wherein the insulating tape includes:

a base layer having a first surface and a second surface opposite to the first surface;

two adhesive layers containing nano-sized silica particles, and each overlapping a corresponding one of the first surface and the second surface; and two reinforcing layers that are each provided for a corresponding one of the first surface and the second surface, and are bonded to the base layer by the adhesive layers, and wherein each of the adhesive layers forms a continuous layer distinct from the reinforcing layers, and directly contacts the first surface or the second surface of the base layer, and wherein the reinforcing layers overlap sides of the adhesive layers opposite to the base layer.

2. The rotating electrical machine according to claim 1, wherein the insulating tape has portions overlapping each other, and the coil includes a covering portion containing nano-sized mica particles, being interposed between the two portions overlapping each other, and covering the conductor.

3. The rotating electrical machine according to claim 2, wherein the nano-sized mica particles are uniformly dispersed in the covering portion.

4. The rotating electrical machine according to claim 2, wherein the nano-sized silica particles are contained only in the adhesive layers, and nano-sized mica particles are contained only in the covering portion.

5. The rotating electrical machine according to claim 2, wherein the covering portion fills a space between overlapping portions of the insulating tape.

6. The rotating electrical machine according to claim 1, wherein the adhesive layers are provided on both the first surface and the second surface so as to sandwich the base layer.

7. The rotating electrical machine according to claim 1, wherein the nano-sized silica particles are configured to suppress electrical tree propagation along an interface between the base layer and the adhesive layers.

8. The rotating electrical machine according to claim 1, wherein the insulating tape is wound in a half-wrap manner such that a spiral pitch is half a width of the insulating tape.

9. The rotating electrical machine according to claim 1, wherein the insulating tape is wound in multiple layers.

10. An insulating tape covering a conductor of a coil of a rotating electrical machine, the insulating tape comprising:

a base layer having a first surface and a second surface opposite to the first surface;

two adhesive layers containing nano-sized silica particles, and each overlapping a corresponding one of the first surface and the second surface; and two reinforcing layers that are each provided on a corresponding one of the first surface and the second surface, and are bonded to the base layer by the adhesive layers, wherein each of the adhesive layers forms a continuous layer distinct from the reinforcing layers, and directly contacts the first surface or the second surface of the base layer, and the reinforcing layers overlap sides of the adhesive layers opposite to the base layer.

* * * * *